(12) United States Patent
Kanagawa et al.

(10) Patent No.: US 7,435,127 B2
(45) Date of Patent: Oct. 14, 2008

(54) CARD-TYPE APPARATUS

(75) Inventors: Kiyoshi Kanagawa, Yokohama (JP); Masanobu Okada, Sagamihara (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 11/574,650

(22) PCT Filed: Jul. 13, 2005

(86) PCT No.: PCT/JP2005/012945

§ 371 (c)(1),
(2), (4) Date: Mar. 2, 2007

(87) PCT Pub. No.: WO2006/027896

PCT Pub. Date: Mar. 16, 2006

(65) Prior Publication Data

US 2008/0009174 A1    Jan. 10, 2008

(30) Foreign Application Priority Data

Sep. 10, 2004    (JP) .............................. 2004-264176

(51) Int. Cl.
*H01R 13/64* (2006.01)
(52) U.S. Cl. .................................................. 439/377
(58) Field of Classification Search ................ 439/159, 439/630, 377, 331, 326, 138, 165, 136, 945, 439/638; 361/684, 737, 726; 235/486, 492, 235/454
See application file for complete search history.

(56) References Cited

U.S. PATENT DOCUMENTS

| | | | | |
|---|---|---|---|---|
| 5,822,183 A | * | 10/1998 | Kanda et al. | 361/684 |
| 5,877,488 A | | 3/1999 | Klatt et al. | |
| 6,069,795 A | | 5/2000 | Klatt et al. | |
| 6,951,472 B2 | * | 10/2005 | Shih | 439/326 |

(Continued)

FOREIGN PATENT DOCUMENTS

EP    0 704 813    4/1996

(Continued)

OTHER PUBLICATIONS

Written Opinion with English Translation.

(Continued)

*Primary Examiner*—Edwin A. León
(74) *Attorney, Agent, or Firm*—Ostrolenk, Faber, Gerb & Soffen, LLP

(57) ABSTRACT

A card-type apparatus includes a circuit substrate and a card-type case for accommodating the circuit substrate including a flat portion disposed opposite to the circuit substrate with a gap between the circuit substrate and the flat portion. A memory card accommodating space, provided between the flat portion of the card-type case and the circuit substrate, is capable of detachably accommodating the memory card inserted from a memory card slot along the circuit substrate surface. A terminal is provided on a region of the circuit substrate in the memory card accommodating space. A plate section for adjusting the gap is provided on the flat portion on the side of the memory card accommodating space. On the plate section, a protrusion is provided so as to increase the contact pressure between the memory card and the terminal by pressing the memory card stored in the memory card accommodating space against the terminal.

14 Claims, 4 Drawing Sheets

U.S. PATENT DOCUMENTS

2003/0190832 A1* 10/2003 Matsunaga et al. .......... 439/331

FOREIGN PATENT DOCUMENTS

| | | |
|---|---|---|
| GB | 2 226 192 | 6/1990 |
| JP | 8-96089 | 4/1996 |
| JP | 9-17493 | 1/1997 |
| JP | 10-172659 | 6/1998 |
| JP | 2002-298092 | 10/2002 |
| JP | 2003-331223 | 11/2003 |

OTHER PUBLICATIONS

International Search Report issued Aug. 16, 2005.
Korean Office Action issued Jan. 31, 2007.
European Search Report issued May 6, 2008.
Taiwanese Office Action dated Mar. 12, 2008 and English language translation.

* cited by examiner

US 7,435,127 B2

CARD-TYPE APPARATUS

CROSS-REFERENCE TO RELATED APPLICATIONS

The present application is a 35 U.S.C. §371 national phase conversion of PCT/JP2005/012945 filed on Jul. 13, 2005, which claims priority of JP2004-264176 filed Sep. 10, 2004, incorporated by reference.

BACKGROUND OF THE INVENTION

1. Technical Field

The present invention relates to a card-type apparatus, such as a CF card, on which a memory card, such as a subscriber identity module (SIM) card, can be attached. Compact Flash (CF) is a trademark registered at the Japanese Patent Office.

2. Background Art

FIG. 7a is a schematic perspective view of an example of a card-type apparatus. FIG. 7b is a schematic cross-sectional view taken along line A-A in FIG. 7a. A card-type apparatus 1 is, for example, a PC card or a CF card and includes a circuit substrate 2 and a card-type case 3 accommodating the circuit substrate 2. The card-type apparatus 1 is capable of detachably storing a memory card 5, such as a SIM card, by inserting the memory card 5 into the card-type case 3 through a memory card slot 4 formed at one end of a side surface of the card-type case 3, as shown by a dotted line in FIG. 7a.

More specifically, according to the configuration of the card-type apparatus 1, the card-type case 3 includes a flat portion 6 disposed opposite to the front surface of the circuit substrate 2 stored in the card-type case 3 with a gap between the flat portion 6 and the front substrate surface. Part of the gap between the flat portion 6 and the circuit substrate 2 is a memory card accommodating space 8 provided for accommodating the memory card 5. Terminals 12 are provided in the memory card accommodating space 8 on the front surface of the circuit substrate 2, as shown in the schematic cross-sectional view in FIG. 7c, so that when the memory card 5 is stored in the memory card accommodating space 8, the terminals 12 oppose the memory card 5. On the surface of the memory card 5 (the back side of the memory card 5 in FIG. 7a), electrodes 10 for electrically connecting the circuit embedded in the memory card 5 to the outside are provided. The terminals 12 are arranged so that the terminals 12 correspond to the electrodes 10. When the memory card 5 is stored inside the memory card accommodating space 8, the terminals 12 contact and connect with the electrodes 10 of the memory card 5 so as to electrically connect the circuits in the memory card 5 with circuits in the circuit substrate 2. In the example illustrated in FIGS. 7b and 7c, the terminals 12 are disposed on a connector unit 13 on the circuit substrate 2.

Examples of card-type apparatuses are shown in the following documents:

[Patent Document 1] Japanese Unexamined Patent Application Publication No. 2002-298092

[Patent Document 2] Japanese Unexamined Patent Application Publication No. 9-17493

[Patent Document 3] Japanese Unexamined Patent Application Publication No. 10-172659

The thickness D of the card-type case 3, for example, conforms to a standard. For this reason, considering the thickness of the circuit substrate 2, the height of components of the circuitry mounted on the circuit substrate 2 (especially the height of tall components), and the thickness of the flat portion 6 of the card-type case 3, the gap H between the substrate surface of the circuit substrate 2 and the flat portion 6 of the card-type case 3 is inevitably determined. The thickness d of the memory card 5, for example, also conforms to a standard.

According to the example illustrated in FIG. 7b, the terminals 12 are disposed on the upper surface of the connector unit 13. In some cases, the gap between the terminals 12 and the flat portion 6 may be wider than the thickness d of the memory card 5. In such a case, if the memory card 5 is inserted and stored in the memory card accommodating space 8 between the circuit substrate 2 and the flat portion 6, the memory card 5 may be too loose inside the memory card accommodating space 8. In such a case, the electrodes 10 of the memory card 5 cannot stably contact and connect with the terminals 12 of the circuit substrate 2. As a result, the electrical connection between the circuit of the memory card 5 and the circuits of the circuit substrate 2 becomes unstable.

Accordingly, to prevent such a problem, various configurations for providing stable electrical contact between the electrodes 10 of the memory card 5 and the terminals 12 on the side of the circuit substrate 2 have been proposed. However, the proposed configurations have had problems, such as a large number of components and/or complicated structures, or a circuit configuration area is reduced due to an increase in the area in the card-type case 3, used for the proposed configuration or a high production cost causing a difficulty in reducing the cost for the card-type apparatus 1. None of the configurations have been satisfactory.

SUMMARY OF THE INVENTION

The embodiments of the present invention described below are provided to solve the above-identified problems. More specifically, an example of a card-type apparatus according to an embodiment of the present invention may include a circuit substrate, and a card-type case for accommodating the circuit substrate. The card-type case includes a flat portion, wherein the flat portion is disposed opposite to a front side or a back side of the circuit substrate with a gap between the circuit substrate and the flat portion. Part of the gap between the flat portion of the card-type case and the opposed circuit substrate surface defines a memory card accommodating space. The memory card is detachably inserted into the memory card accommodating space from a memory card slot communicating with the memory card accommodating space, in a direction along the circuit substrate surface. A terminal for electrically connecting the memory card with a circuit on the circuit substrate is provided on a region of the circuit substrate disposed in the memory card accommodating space. A plate section for adjusting the gap between the circuit substrate and the flat portion is disposed on the flat portion of the card-type case at a position opposing the memory card. A protrusion is provided on the plate section for increasing the contact pressure between the memory card and the terminal by pressing the memory card against the terminal of the circuit substrate.

According to this embodiment of the present invention, in the flat portion of the card-type case, a plate section for adjusting the gap is disposed at a position opposing the memory card stored in the memory card accommodating space. The plate section has a protrusion. According to this configuration, even if the gap between the flat portion of the card-type case and the circuit substrate stored in the card-type case is not the correct size because of various limitations, the gap (the height of the memory card accommodating space) where the memory card is inserted can be adjusted by simply adjusting the thickness of the plate section or the height of the protrusion on the plate section. Accordingly, even if the gap between the positions of the terminals on the circuit substrate and the flat portion of the card-type case is too wide in comparison with a thickness of the memory card, the memory card can still be stored inside the memory card accommodating space in stable electrical contact with the terminal of the circuit substrate due to the pressure applied by the plate section and the protrusion on the plate section.

In other words, simply by providing the plate section and the protrusion on the plate section, the memory card stored in the memory card accommodating space can be electrically connected to the terminal of the circuit substrate stably with a suitable contact pressure. In this way, material cost and production cost can be significantly reduced, and stability of the electrical connection between the memory card and the terminals on the circuit substrate can be improved while preventing a reduction in the circuit configuration area.

With the configuration disclosed herein, the memory card is connected with good contact pressure to the terminals on the circuit substrate simply by providing the plate section for adjusting the gap and providing the protrusions on the plate section, which enables the memory card to be electrically connected with contact pressure to the terminal on the circuit substrate.

Conventional card-type apparatus may require an additional operation mechanism for connecting the memory card to the terminals of the circuit substrate with contact pressure. Such a mechanism has components that may fail. However, since the disclosed embodiment of the invention requires no such operation mechanism, a potential risk of failure is avoided.

Other features and advantages of the present invention will become apparent from the following description of embodiments of the invention which refers to the accompanying drawings.

BRIEF DESCRIPTION OF THE DRAWINGS

FIG. 7b is a schematic cross-sectional view taken along line A-A in FIG. 7a.

DETAILED DESCRIPTION OF EMBODIMENTS OF THE INVENTION

Reference Numerals

Figure 1:
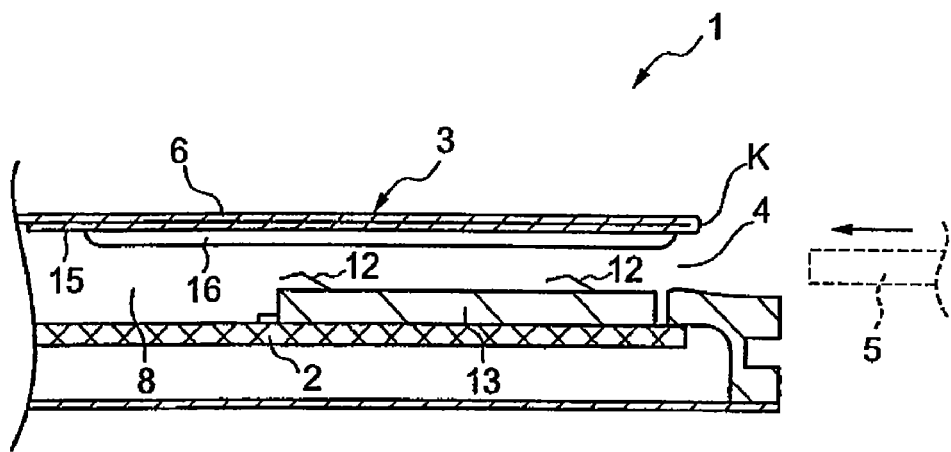
FIG. 1 is a cross-sectional view of the characteristic components in a card-type apparatus according to a first embodiment.

1 card-type apparatus
2 circuit substrate
3 card-type case
4 memory card slot
5 memory card
6 flat portion
8 memory card accommodating space
12 terminals
15 plate section for adjusting a gap
16 protrusions Embodiments of the present invention will be described below with reference to the drawings. In the descriptions of the embodiments below, the components that are the same as those of the card-type apparatus 1 shown in FIGS. 7a to 7c are represented by the same reference numerals and common parts are not described.

Figure 7A:
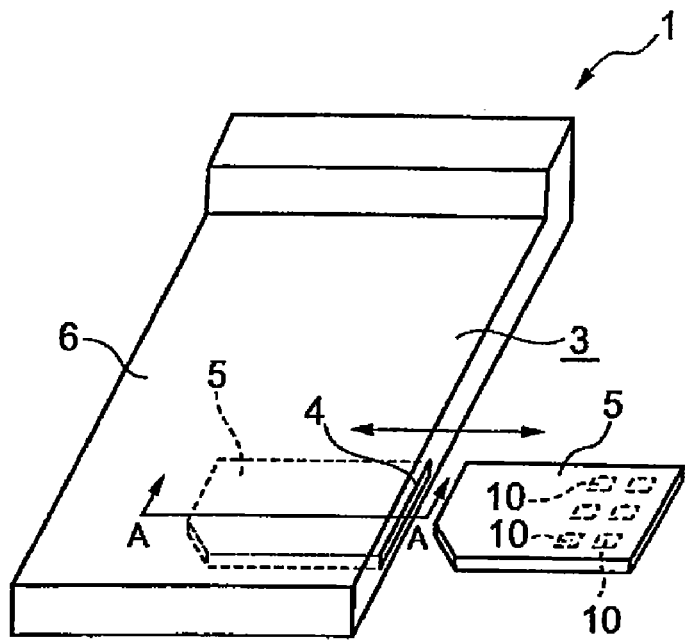
FIG. 7a is schematic perspective view of a known card-type apparatus.
Figure 7B:
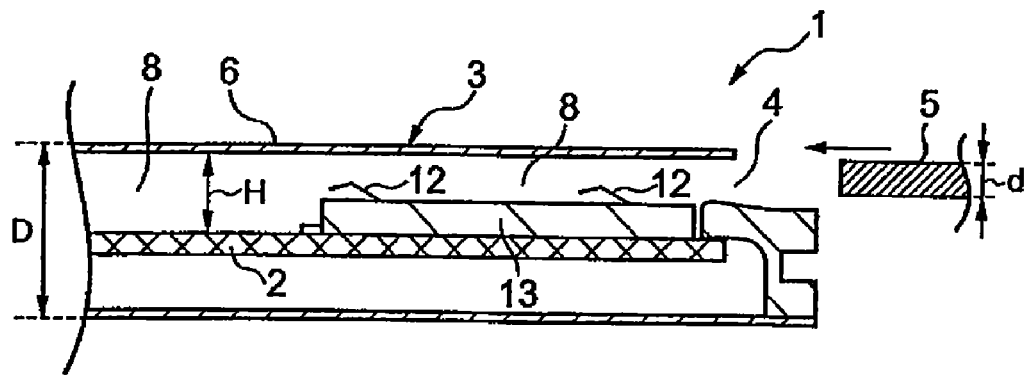
Figure 7C:
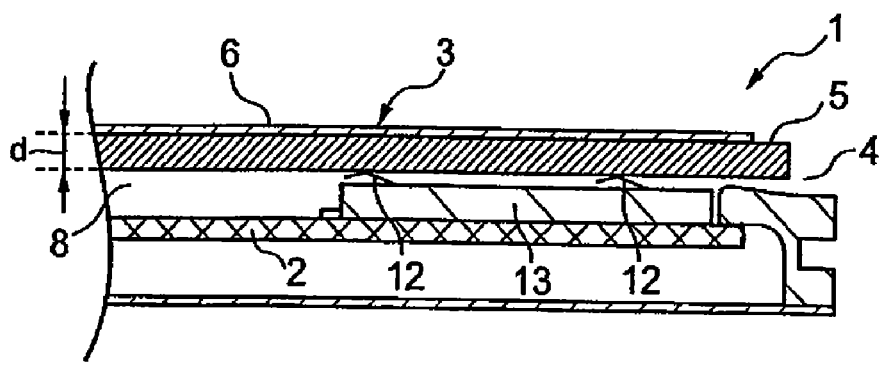
FIG. 7c is a schematic cross-sectional view taken along line A-A in FIG. 7a illustrating a state in which a memory card is stored in a memory card accommodating space.

Similar to the card-type apparatus 1 shown in FIG. 7a, a card-type apparatus 1 according to the first embodiment includes a circuit substrate 2 and a card-type case 3 accommodating the circuit substrate 2. The card-type apparatus 1 is configured such that a memory card 5 is inserted along the substrate surface of the circuit substrate 2 from a memory card slot 4 formed at a side surface of the card-type case 3 and is detachably stored in a memory card accommodating space 8 inside the card-type case 3.

FIG. 1 is a schematic cross-sectional view illustrating the characteristic components according to the first embodiment. FIG. 1 is a cross-sectional view of the card-type apparatus 1 taken along a line positioned at the same position as the line A-A in FIG. 7a. According to the first embodiment, although not shown in the drawings, latching units configured to latch the circuit substrate 2 are provided inside the card-type case 3 so as to hold the circuit substrate 2 in the center of the thickness direction of the card-type case 3.

According to the first embodiment, a plate section 15 for adjusting the gap between the flat portion 6 and the circuit substrate 2 is provided on the flat portion 6 disposed opposite to the surface of the circuit substrate 2 with a gap therebetween. The position of the plate section 15 for adjusting the gap on the flat portion 6 is a position opposing the memory card 5 inserted in the memory card accommodating space 8. The plate section 15 has protrusions 16 extended towards the circuit substrate 2 formed by, for example, extruding. According to the first embodiment, the components of the card-type apparatus 1 except for the configuration related to the plate section 15 for adjusting the gap and the protrusions 16 are the same as those of the card-type apparatus 1 shown in FIG. 7a.

A configuration for ejecting the memory card 5 from the memory card accommodating space 8 is provided in the card-type apparatus 1. The configuration is not limited and various configurations may be used. Descriptions of the configurations are omitted here.

Figure 2A:
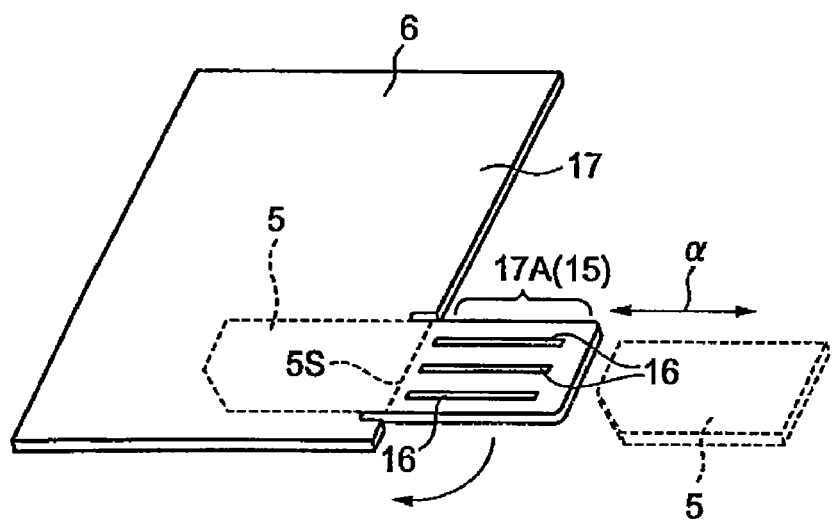
FIG. 2a is a schematic view illustrating, together with FIG. 2b, an exemplary configuration of a flat portion of a card-type case constituting the card-type apparatus according to the first embodiment.
Figure 2B:
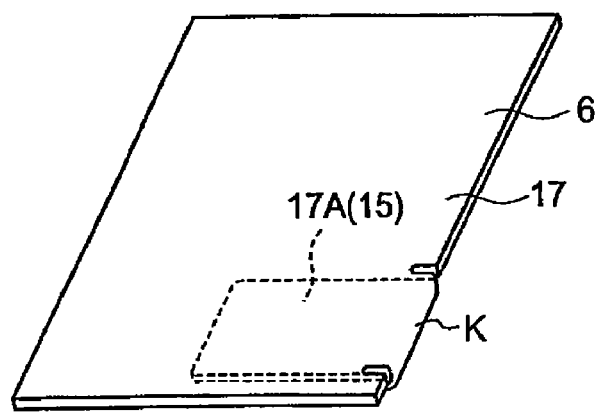
FIG. 2b is a schematic view illustrating, together with FIG. 2a, an exemplary configuration of a flat portion of a card-type case constituting the card-type apparatus according to the first embodiment.

According to the first embodiment, the flat portion 6 of the card-type case 3 is constituted of a plate member 17 that is composed of, for example, metal, as shown in the schematic perspective view in FIG. 2b. The plate member 17, as shown in FIG. 2a, includes a protruding section 17A that protrudes in the removal direction α of the memory card 5 further than the edge of the card-type case on the inserting end 5s of the memory card 5. The protruding section 17A is folded inwards to form the plate section 15 for adjusting the gap. The size of the plate section 15 for adjusting the gap may be the same size as the memory card 5 or may be a size large enough to oppose all of the terminals 12.

Figure 3A:
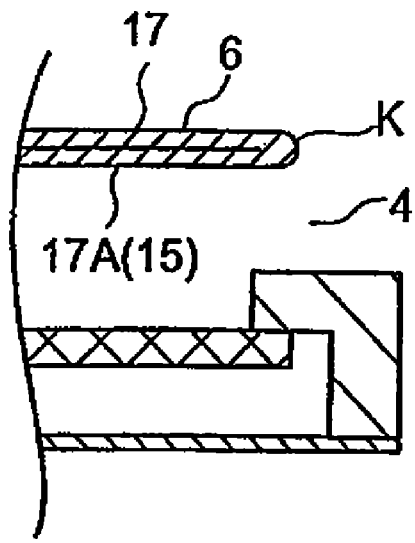
FIG. 3a is a schematic view illustrating, together with FIG. 3b, one of the advantages of the configuration according to the first embodiment.

According to the first embodiment, a folded portion K on the base end of the protruding section 17A constitutes part of an open end of the memory card slot 4, as shown in the schematic cross-sectional view in FIG. 3a.

Figure 3B:
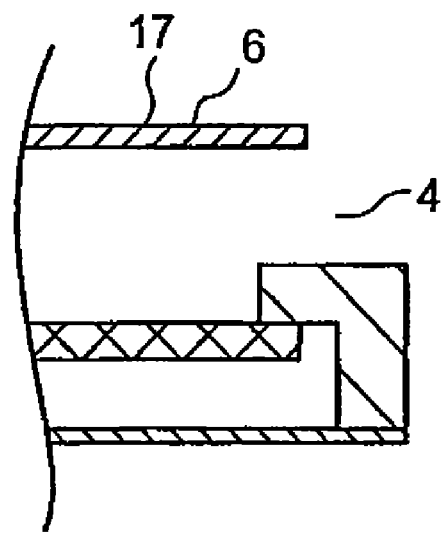
FIG. 3b is a schematic view illustrating, together with FIG. 3a, one of the advantages of the configuration according to the first embodiment.

On the other hand, conventionally, in some cases, as shown in the diagram in FIG. 3b, part of an open end of the memory card slot 4 is provided by the end surface (i.e., a cut surface) of the plate member 17. The end surface of the plate member 17 has minute burrs caused by, for example, cutting. Therefore, for example, when removing or attaching the memory card 5, a person's finger may come into contact with the end surface of the plate member 17 and there is a danger of hurting the finger. On the other hand, according to the first embodiment, the folded portion K on the base end of the protruding section 17A forms part of the open end of the memory card slot 4, and the end (the cut surface) of the protruding section 17A is positioned inside the card-type case 3. Therefore, the end surface of the plate member 17 is most likely prevented from being in contact with a person's finger. In this way, danger caused by the end surface of the plate member 17 can be mostly reduced.

The protrusions 16 provided on the plate section 15 for adjusting the gap have a rib configuration extending in the insertion direction α of the memory card 5 inserted into the memory card accommodating space section 8 from the memory card slot 4. According to the first embodiment, a plurality of protrusions 16 are disposed parallel to each other with spaces between the protrusions 16. The protrusions 16 are provided so as to increase the contact pressure between memory card 5 and the terminals 12 by pushing the memory card 5 stored in the memory card accommodating space 8 against the terminals 12. According to the first embodiment, the terminals 12 are configured so that the terminals 12 apply an urging force to the memory card 5 by elastically deforming due to the pressure from the memory card 5.

According to the first embodiment, the protrusions 16 for adjusting the gap are not directly provided on the flat portion 6 but are provided on the plate section 15 which in turn is disposed on the flat portion 6. This is because of the following reason. The protrusions 16 were formed by extruding. Therefore, if the protrusions 16 are directly provided on the flat portion 6, depressions caused by the protrusions 16 would be formed on the outer surface of the flat portion 6, causing a bad appearance. On the other hand, since the plate section 15 for adjusting the gap is disposed on the back side of the flat portion 6 and cannot be seen from the outer side, by providing the protrusions 16 on the plate section 15, the problem of unattractive appearance can be prevented.

According to the first embodiment, the plate section 15 for adjusting the gap is configured by folding the protruding section 17A provided on the plate member 17 constituting the flat portion 6. Therefore, since both the flat portion 6 and the plate section 15 for adjusting the gap are formed from the same plate member 17, when the thickness of the flat portion 6 is determined, inevitably, the thickness of the plate section 15 for adjusting the gap is also determined. In other words, there is an advantage in that production is facilitated, but there is also a disadvantage in that the flexibility (i.e., the flexibility in designing the gap between the position of the terminals 12 and the plate section 15) is low. On the other hand, according to the first embodiment, the protrusions 16 are provided on the plate section 15 for adjusting the gap, and there are substantially no limitations on the protrusion height of the protrusions 16, so that the flexibility in the design of the protrusions 16 is high. Therefore, by variably adjusting the protrusion height of the protrusions 16, the height of the memory card accommodating space 8 can be adjusted so that the contact pressure between the memory card 5 and the terminals 12 is suitable for obtaining a reliable electrical connection.

According to the first embodiment, the protrusions 16 provided on the plate section 15 for adjusting the gap have a rib configuration extending in the insertion direction α of the memory card 5 inserted into the memory card accommodating space 8 from the memory card slot 4. Therefore, when the memory card 5 is moving forward while being inserted into the memory card accommodating space section 8, the memory card 5 will not be caught by the protrusions 16 and can move smoothly forward toward the back side of the memory card accommodating space 8. In other words, the protrusions 16 do not interfere with the insertion of the memory card 5.

Moreover, according to the first embodiment, the flat portion 6 of the card-type case 3 includes a plate member 17, wherein the plate member 17 includes a protruding section 17A protruding in the removal direction of the memory card 5 further than the edge of the card-type case 3 on the inserting end of the memory card 5, and the base end of the protruding section 17A is folded inwards to form the plate section 15 for adjusting the gap. Since the plate section 15 for adjusting the gap can be easily formed by simply folding the protruding section 17A formed on the plate member 15 of the flat portion 6 inwards to the card-type case 3 at the base end of the protrusion, the production process can be made less complicated.

A second embodiment will be described below. In the description for the second embodiment, the components that are the same as those according to the first embodiment are represented by the same reference numerals and the common parts are not described.

Figure 4:
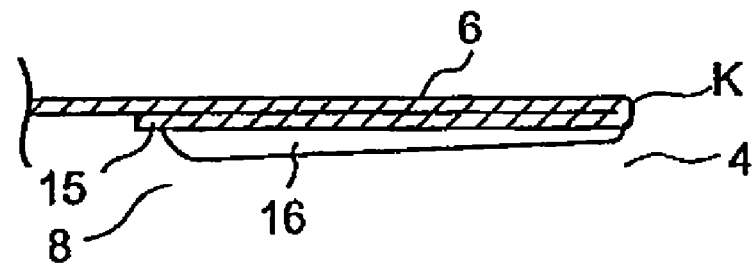
FIG. 4 is a schematic view of the characteristic components in a card-type apparatus according to a second embodiment.

According to the second embodiment, as shown in the schematic cross-sectional view in FIG. 4, the protrusion height of the protrusions 16 provided on the plate section 15 for adjusting the gap is gradually increased from the memory card slot 4 toward the back side of the memory card accommodating space 8. Other configurations are the same as those according to the first embodiment.

According to the second embodiment, the protrusion height of the protrusions 16 of the plate section 15 for adjusting the gap is gradually increased from the memory card slot 4 toward the back side of the memory card accommodating space 8. Therefore, the following advantageous effects can be obtained. More specifically, the protrusion height of the protrusions 16 on the side of the memory card slot 4 is decreased so that the memory card 5 is easily inserted into the memory card accommodating space 8 from the memory card slot 4. At the same time, the height of the terminals 12 on the side of the memory card accommodating space 8 causes the memory card 5 to be pressed against the terminals 12 of the circuit substrate 2 so that the contact pressure between the memory card 5 and the terminals 12 of the circuit substrate 2 is increased. In this way, it is easy to achieve both an improvement in the insertability of the memory card 5 and an improvement in the stability of the contact connection between the memory card 5 and the terminals 12.

Figure 5:
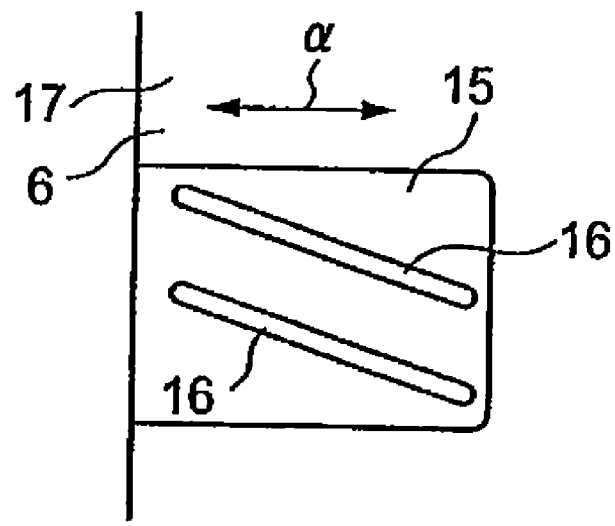
FIG. 5 is a schematic plan view of protrusions provided on a plate section for adjusting a gap according to another embodiment.

The present invention is not limited to the first and second embodiments and may be applied to develop different embodiments. For example, according to the first and second embodiments, the protrusions 16 have a rib configuration extending along the insertion direction α of the memory card 5. However, the configuration of the protrusions 16 may be, for example, a rib configuration extending in a diagonal direction intersecting the insertion direction α of the memory card 5, as shown in the plan view in FIG. 5.

Moreover, the protrusions 16 may not have a linear configuration but may have a point-like configuration or planar configuration. The configuration of the protrusions 16 is not limited so long as the contact pressure between the memory card 5 and the terminals 12 when pressing the memory card 5 against the terminals 12 can be increased.

If point-like protrusions were provided, for example, the point-like protrusions could be disposed at intervals on the plate section 15 for adjusting the gap. In another example, a plurality of point-like protrusions could be aligned along at least one imaginary line with spaces between the protrusions and/or between the line(s).

Figure 6A:
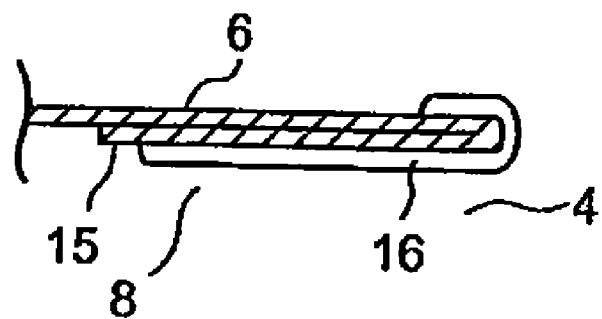
FIG. 6a illustrates protrusions according to another embodiment.
Figure 6B:
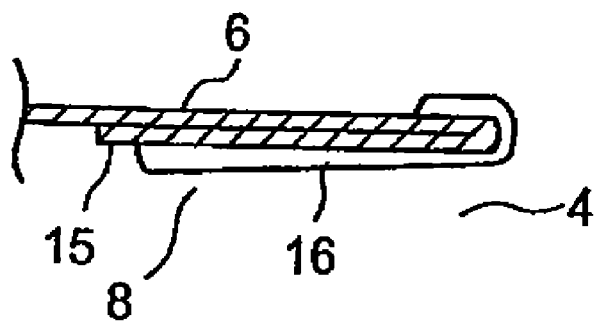
FIG. 6b illustrates protrusions according to another embodiment.

According to the first and second embodiments, the protrusions 16 are provided only at positions opposite to the memory card 5 stored in the memory card accommodating space 8. However, for example, as shown in the cross-sectional view in FIG. 6a, the protrusions 16 may be configured so that the protrusions 16 wrap around to the front surface of the flat portion 6 through the open end of the memory card slot 4 from the portion opposing the memory card 5. Part of the portion constituting the open end of the memory card slot 4 at the end portion of the flat portion 6 is free to move since it is neither supported nor fixed. Therefore, the mechanical strength is low. However, when the protrusions (ribs) 16 are, as shown in the example in FIG. 6a, wrapped around to the outer side of the card from the inner side of the card at the end portion along the end surface, the strength of the end portion is improved. When the protrusions 16 are wrapped around to the front surface of the flat portion 6, as shown in the cross-sectional view in FIG. 6b, similar to the second embodiment, the protrusion height of the protrusions 16 may be increased from the memory card slot 4 toward the back side of the memory card accommodating space 8.

According to the first and second embodiments, the terminals 12 are mounted on the circuit substrate 2 by being mounted on the connector unit 13. However, the terminals 12 may be directly disposed on the substrate surface of the circuit substrate 2.

Moreover, according to the first and second embodiments, the protrusions 16 were formed by extruding. However, the protrusions 16, for example, may be formed by a method other than extruding.

According to the first and second embodiments, the plate section 15 for adjusting the gap is formed by folding back the protruding section 17A provided on the plate member 17 constituting the flat portion 6. However, the plate section 15 for adjusting the gap may be constituted of a plate member separate from the plate member 17, and then the plate section 15 for adjusting the gap may be attached to the flat portion 6 (plate member 17) with, for example, an adhesive. In such a case, the thickness of the plate section 15 for adjusting the gap can be set without being limited by the thickness of the flat portion 6 (plate member 17), and the flexibility of the design can be increased.

The present invention can be applied to a card-type apparatus having a function for accommodating a memory card. According to embodiments of the present invention, the structure of the apparatus is made less complicated, and, at the same time, stability of the electrical connection between the memory card and the circuit of the circuit substrate can be obtained. Therefore, the present invention is effective for a card-type apparatus that is required to be compact and low-profile and further provide highly reliable electrical performance while the memory card is inserted in the apparatus.

Although the present invention has been described in relation to particular embodiments thereof, many other variations and modifications and other uses will become apparent to those skilled in the art. Therefore, the present invention is not limited by the specific disclosure herein.

The invention claimed is:

1. A card-type apparatus comprising:
a circuit substrate including a substrate surface and a circuit comprising a terminal;
a card-type case configured to accommodate the circuit substrate, the card-type case including a flat portion disposed opposite to the substrate surface of the circuit substrate with a gap defined between the substrate surface of the circuit substrate and the flat portion, a part of the gap defining a memory card accommodating space configured to removably receive a memory card from a memory card slot communicating with the memory card accommodating space in an insertion direction parallel to the circuit substrate surface;
the terminal configured to connect electrically the memory card with a circuit on the circuit substrate and provided on a region of the circuit substrate in the memory card accommodating space;
a plate section configured to adjust the gap disposed on the flat portion of the card-type case at a position opposing the memory card when inside the memory card accommodating space; and
a protrusion provided on the plate section so as to increase contact pressure between the memory card inside the memory card accommodating space and the terminal by pressing the memory card against the terminal on the circuit substrate.

2. The card-type apparatus according to claim 1,
wherein the flat portion of the card-type case comprises a plate member,
wherein the plate member includes a protruding section protruding in a removal direction of the memory card further than edge of the card-type case on an inserting end of the memory card, and
wherein the protruding section is folded inwards to form the plate section for adjusting the gap.

3. The card-type apparatus according to claim 1, wherein the protrusion provided on the plate section for adjusting the gap has a rib configuration extending diagonal to the insertion direction of the memory card.

4. The card-type apparatus of claim 1, further comprising a second protrusion positioned on the plate section and configured to increase pressure between the memory card and the terminal by pressing the memory card against the terminal, the second protrusion being of substantially identical dimensions to the protrusion.

5. The card-type apparatus of claim 1, wherein the protrusion has a length in the insertion direction greater than a width of the protrusion.

6. The card-type apparatus of claim 1, wherein the apparatus is one of a PC card or a CF card.

7. The card-type apparatus according to claim 1, wherein the protrusion has a rib configuration extending in the insertion direction of the memory card.

8. The card-type apparatus according to claim 7,
wherein the flat portion of the card-type case comprises a plate member,
wherein the plate member includes a protruding section protruding in a removal direction of the memory card further than an edge of the card-type case on an inserting end of the memory card, and wherein the protruding section is folded inwards to form the plate section for adjusting the gap.

9. The card-type apparatus according to claim 7, wherein said protrusion further extends through said card slot and onto an outer surface of said flat portion of said card-type case.

10. The card-type apparatus according to claim 7, wherein the protrusion has a height that gradually increases from the memory card slot into the memory card accommodating space.

11. The card-type apparatus according to claim 10,
wherein the flat portion of the card-type case comprises a plate member,
wherein the plate member includes a protruding section protruding in a removal direction of the memory card further than an edge of the card-type case on an inserting end of the memory card, and
wherein the protruding section is folded inwards to form the plate section for adjusting the gap.

12. A card-type apparatus comprising:
a circuit substrate including a substrate surface, an inserting side configured to receive a memory card, and a circuit comprising a terminal;
a card-type case configured to accommodate the circuit substrate, the card-type case including a flat portion disposed opposite to the substrate surface of the circuit substrate with a gap defined between the substrate surface of the circuit substrate and the flat portion, a part of the gap defining a memory card accommodating space configured to removably receive the memory card from a memory card slot communicating with the memory card accommodating space in an insertion direction along the circuit substrate surface;
the terminal configured to connect electrically the memory card with a circuit on the circuit substrate and provided on a region of the circuit substrate in the memory card accommodating space;
a plate section configured to adjust the gap, the plate section being disposed on the flat portion of the card-type case at a position opposing the memory card when inside the memory card accommodating space; and
a protrusion provided on the plate section so as to increase contact pressure between the memory card when inside the memory card accommodating space and the terminal by pressing the memory card against the terminal,
wherein the flat portion of the card-type case comprises a plate member including a protruding section protruding in a removal direction of the memory card further than an edge of the card-type case on the inserting side, and
wherein the protruding section is folded inward to form the plate section for adjusting the gap.

13. The card-type apparatus according to claim 12, wherein the protrusion has a rib configuration extending in the insertion direction of the memory card.

14. The card-type apparatus according to claim 12, wherein the protrusion has a height that gradually increases from the memory card slot into the memory card accommodating space.

* * * * *